United States Patent
Bossard

(10) Patent No.: US 8,308,828 B1
(45) Date of Patent: *Nov. 13, 2012

(54) MULTIPLE TUBE MICRO-CHANNEL STEAM REFORMER AND METHOD

(76) Inventor: Peter R. Bossard, Ivyland, PA (US)

( * ) Notice: Subject to any disclaimer, the term of this patent is extended or adjusted under 35 U.S.C. 154(b) by 580 days.

This patent is subject to a terminal disclaimer.

(21) Appl. No.: 12/541,917

(22) Filed: Aug. 15, 2009

Related U.S. Application Data

(63) Continuation-in-part of application No. 12/182,541, filed on Jul. 30, 2008, now Pat. No. 8,105,402.

(51) Int. Cl.
*C01B 3/34* (2006.01)
(52) U.S. Cl. ............. 48/197 R; 48/198.1; 423/650; 423/651; 423/652; 423/655
(58) Field of Classification Search ............... 48/197 R, 48/198.1; 423/650, 651, 652, 655
See application file for complete search history.

(56) References Cited

U.S. PATENT DOCUMENTS

| | | | |
|---|---|---|---|
| 2,625,470 A * | 1/1953 | Roberts, Jr. .............. | 48/198.1 |
| 8,105,402 B1 * | 1/2012 | Bossard .................. | 48/197 R |
| 2008/0148636 A1 * | 6/2008 | Hartvigsen et al. ...... | 48/127.7 |

* cited by examiner

*Primary Examiner* — Timothy Vanoy
(74) *Attorney, Agent, or Firm* — LaMorte & Associates P.C.

(57) ABSTRACT

A steam reformer is use in a fuel processor system to create a water gas shift reaction between a hydrocarbon fuel and water. A hydrocarbon fuel and water are provided. The water is heated to superheated steam. The hydrocarbon fuel is mixed with the superheated steam to produce a vaporized fuel/steam mixture. The vaporized fuel/steam mixture is directed into a gap space between concentric tubes. The gap space between the separate surfaces is very small. Within this confined gap space, the outer concentric tube is heated to maintain a reaction temperature range that induces the water gas shift reaction. The water gas shift reaction produces reactant gases that include hydrogen gas and contaminant gases. At least some of the contaminant gases are burned to heat the gap space.

20 Claims, 3 Drawing Sheets

MULTIPLE TUBE MICRO-CHANNEL STEAM REFORMER AND METHOD

RELATED APPLICATIONS

This application is a continuation-in-part of application Ser. No. 12/182,541, now U.S. Pat. No. 8,105,402 entitled, Micro-Channel Steam Reformer And System For Extracting Ultra-Pure Hydrogen Gas From A Hydrocarbon Fuel, filed Jul. 30, 2008.

BACKGROUND OF THE INVENTION

1. Field of the Invention

In general, the present invention relates to systems and methods that are used to steam reform hydrocarbon fuel in order to generate a volume of mixed gases that contain a high concentration of harvestable hydrogen. More particularly, the present invention is related to systems and methods that produce mixed gases from hydrocarbon fuel for later processing by a hydrogen separator.

2. Prior Art Description

In industry, there are many applications for the use of ultra pure molecular hydrogen. For instance, there are many fuel cells that operate using hydrogen. The hydrogen, however, must be ultra pure. In the art, ultra pure hydrogen is commonly considered to be hydrogen having purity levels of at least 99.999%. Gas with contaminants is unacceptable in certain commercial applications. For example, any molecules of carbon dioxide, carbon monoxide or other contaminant gases can create defects during silicon chip manufacture or can damage the membranes in a fuel cell.

Hydrogen gas does not exist naturally on earth to any significant extent because it reacts with many elements and readily combines to form compounds. Hydrogen gas must therefore be manufactured. Hydrogen gas can be manufactured in a number of ways. For instance, hydrogen gas can be created by splitting water molecules through electrolysis. However, the power needed for electrolysis is always greater than the power available from a fuel cell that utilizes the output hydrogen gas from the electrolysis. Any fuel cell system that obtains hydrogen gas from electrolysis, therefore, results in a net power loss.

Techniques have been developed where hydrogen gas can be extracted from the reformate gases of a hydrocarbon fuel and water mixture that have undergone an endothermic reaction. This initial endothermic reaction occurs between 250° C. and 1000° C., wherein the hydrocarbon fuel is cracked and primarily converted into hydrogen ($H_2$), carbon monoxide (CO), methane ($CH_4$), carbon dioxide ($CO_2$) and water ($H_2O$). The amount of energy required for the reaction depends upon the hydrocarbon being used. A principle challenge is to efficiently supply the energy needed to exhaust the chemical reactions.

The useful chemical energy in the resultant gases is contained in the $H_2$, CO and $CH_4$. The chemical energy in these three resultant gases contains the chemical energy that was originally in the hydrocarbon fuel, plus some of the endothermic energy that was used to heat and maintain the reaction.

Once the hydrocarbon is cracked, the resultant gases of $H_2$, $CH_4$, CO and $CO_2$ are then used in a water gas shift reaction. The resultant gases are mixed with steam at an elevated temperature of between 300° C. and 450° C. In this temperature range, a water gas shift reaction is induced. Once the water gas shift reaction is induced, the CO and the $CH_4$ that is present reacts with the water ($H_2O$). The CO and the $H_2O$ react as follows:

$$CO + H_2O \rightarrow CO_2 + H_2$$

It can therefore be seen that a large amount of hydrogen gas can be created by the water gas shift reaction. The hydrogen gas is then purified by drawing the hydrogen gas through a hydrogen permeable membrane in a hydrogen separator. The purified hydrogen can then be used to power a fuel cell or serve some other industrial purpose.

Systems that utilize a water gas shift reaction in such a manner are exemplified by U.S. Pat. No. 7,704,485, entitled System And Method For Processing Fuel For Use By A Fuel Cell Using A Micro-Channel Catalytic Hydrogen Separator, and U.S. patent application Ser. No. 11/522,139, now abandoned, entitled System And Method For Efficiently Extracting Ultra-Pure Hydrogen Gas From A Hydrocarbon Fuel.

The equation of the water gas shift reaction provided above, of course, reacts until a chemical balance is achieved. In reality, very few chemical reactions continue until exhaustion. Accordingly, in reality, when a water gas shift reaction occurs, some methane, carbon monoxide, and water remains in the raffinate gas. The amount of carbon monoxide that remains depends largely upon the steam-to-carbon ratio present in the reaction. The present invention describes a steam reformer assembly and a fuel processor system that utilizes the steam reformer assembly to increase the efficiencies of the reforming reaction by readily and uniformly transferring the energy in the combustion chamber to the fuel and steam mixture. The present invention steam reformer and fuel processor system are described and claimed below.

SUMMARY OF THE INVENTION

The present invention is a steam reformer that efficiently enables the endothermic energy required for the reforming reaction to be uniformly supplied to the fuel and steam while reacting. A hydrocarbon fuel and water are provided. The water is heated to superheated steam. The hydrocarbon fuel is mixed with the superheated steam to produce a vaporized fuel/steam mixture. The vaporized fuel/steam mixture is directed into a gap space between concentric tubes. The gap space between the separate surfaces is very small and is preferably no greater than 5000 microns. The fuel/steam mixture is both supplied to the gap space and drawn out of the gap space utilizing the concentric tubes.

Within this confined gap space, the outer concentric tube is heated to maintain a reforming reaction of fuel vapor and steam. The water gas shift reaction between the hydrocarbon fuel and the steam produces reactant gases that include hydrogen gas and contaminant gases. At least some of the reactant gases are burned to heat the outer tube and the gap space.

BRIEF DESCRIPTION OF THE DRAWINGS

For a better understanding of the present invention, reference is made to the following description of an exemplary embodiment thereof, considered in conjunction with the accompanying drawings, in which.

DETAILED DESCRIPTION OF THE DRAWINGS

Although the present invention steam reformer can be used to generate gases for a variety of industrial applications, the steam reformer is particularly well suited for use in generating gas for further processing by a hydrogen separator. Accordingly, the exemplary embodiment of the fuel processor system is initially shown with a hydrogen separator to set forth the best mode contemplated for the design.

Figure 1:
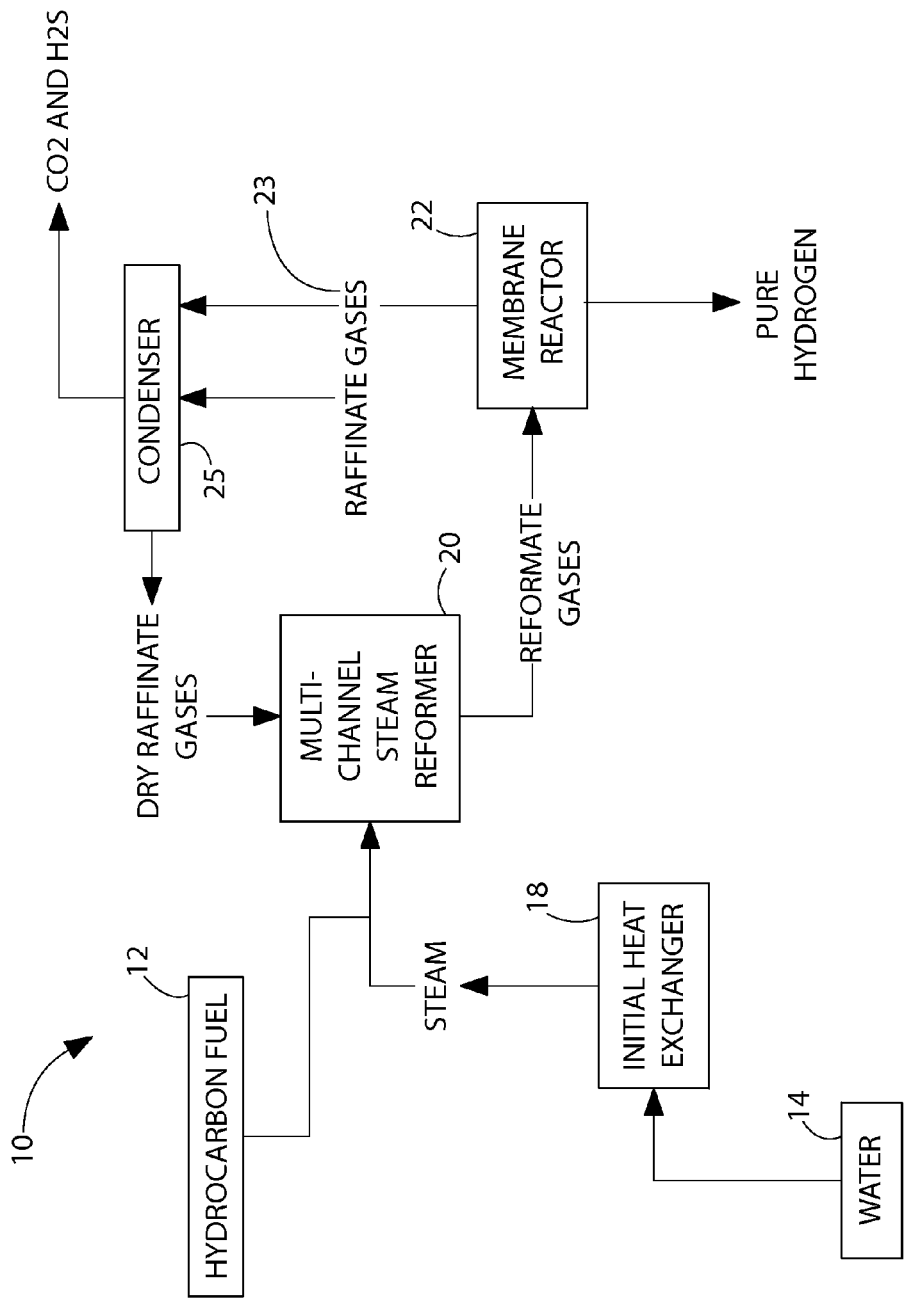
FIG. 1 is a schematic of an exemplary embodiment of a fuel processor system shown containing a multi-channel steam reformer.

Referring to FIG. 1, there is shown a schematic of a fuel processor system 10. The fuel processor system 10 reacts a hydrocarbon fuel 12 and water 14 to produce hydrogen gas in a highly efficient manner. The hydrogen gas produced is ultra-pure and is used for a secondary purpose, such as powering a PEM fuel cell.

The fuel processor system 10 includes an initial heat exchanger 18. Water 14 is converted to superheated steam by the initial heat exchanger 18. The hydrocarbon fuel 12 is mixed with the superheated steam. Upon mixing, the hydrocarbon fuel 12 is completely vaporized and begins to react with the steam. The hydrocarbon/steam combination is fed into a micro-channel steam reformer 20. Within the micro-channel steam reformer 20, the conditions for the water gas shift reaction are maximized, as will later be explained in detail. The micro-channel steam reformer 20 produces reformate gases that include primarily hydrogen ($H_2$), carbon dioxide ($CO_2$) and steam ($H_2O$). However, smaller concentrations of carbon monoxide (CO) and methane ($CH_4$) are also present. Furthermore, depending upon the type of hydrocarbon fuel 12 being used, trace amounts of hydrogen sulfate ($H_2S$) may also be present.

As will later be explained, the micro-channel steam reformer 20 is actively heated by combustion in order to provide the energy needed to maintain the endothermic reaction. Heat from the combustion exhaust gases are transferred to the initial heat exchanger 18 to help heat the incoming water.

The reformate gases from the micro-channel steam reformer 20 are fed to a hydrogen separator 22. The hydrogen separator 22 contains a hydrogen permeable membrane and enables hydrogen gas to be separated from the remaining reformate gases. Although many different membrane reactor designs can be utilized, the preferred hydrogen separator is a micro-channel membrane separator, such as that described in co-pending U.S. patent application Ser. No. 12/053,528, entitled Hydrogen Gas Separator System Having Micro-Channel Construction For Efficiently Separating Hydrogen Gas From A Mixed Gas Source, the disclosure of which is incorporated into this specification by reference.

The hydrogen separator 22 is not one-hundred percent efficient. Consequently, some hydrogen gas passes into the output raffinate 23. The raffinate 23 exiting the hydrogen separator 22, therefore, contains some hydrogen ($H_2$) as well as the carbon dioxide ($CO_2$), steam ($H_2O$), carbon monoxide (CO), methane ($CH_4$) and hydrogen sulfate ($H_2S$) that entered the hydrogen separator 22.

The raffinate 23 exiting the hydrogen separator 22 has much of its thermal energy reclaimed. Furthermore, the raffinate 23 still contains some chemical energy. Consequently, the raffinate 23 is not directly vented as exhaust. Rather, the flow rate through the hydrogen separator 22 is controlled so that the raffinate 23 contains just enough hydrogen gas and methane to burn. To enhance the combustion characteristics of the raffinate 23, much of the steam contained in the raffinate 23 is removed. The steam is removed by cooling the raffinate 23 below the condensation temperature of steam in a condenser 25. Once the raffinate 23 has cooled, the steam condenses to water. As the water condenses, much of the carbon dioxide ($CO_2$) and hydrogen sulfide ($H_2S$) dissolves into the condensed water. The result is that the remaining gaseous raffinate stream is both dried and simplified. The dry raffinate gases, therefore, contain primarily hydrogen ($H_2$), carbon monoxide (CO), and methane ($CH_4$). The hydrogen ($H_2$) and methane ($CH_4$) contained in the dried raffinate gases are combustible and are used to heat the micro-channel steam reformer 20. Consequently, both the thermal energy and the remaining chemical energy of the raffinate 23 is recaptured, therein producing a highly energy efficient system.

Figure 2:
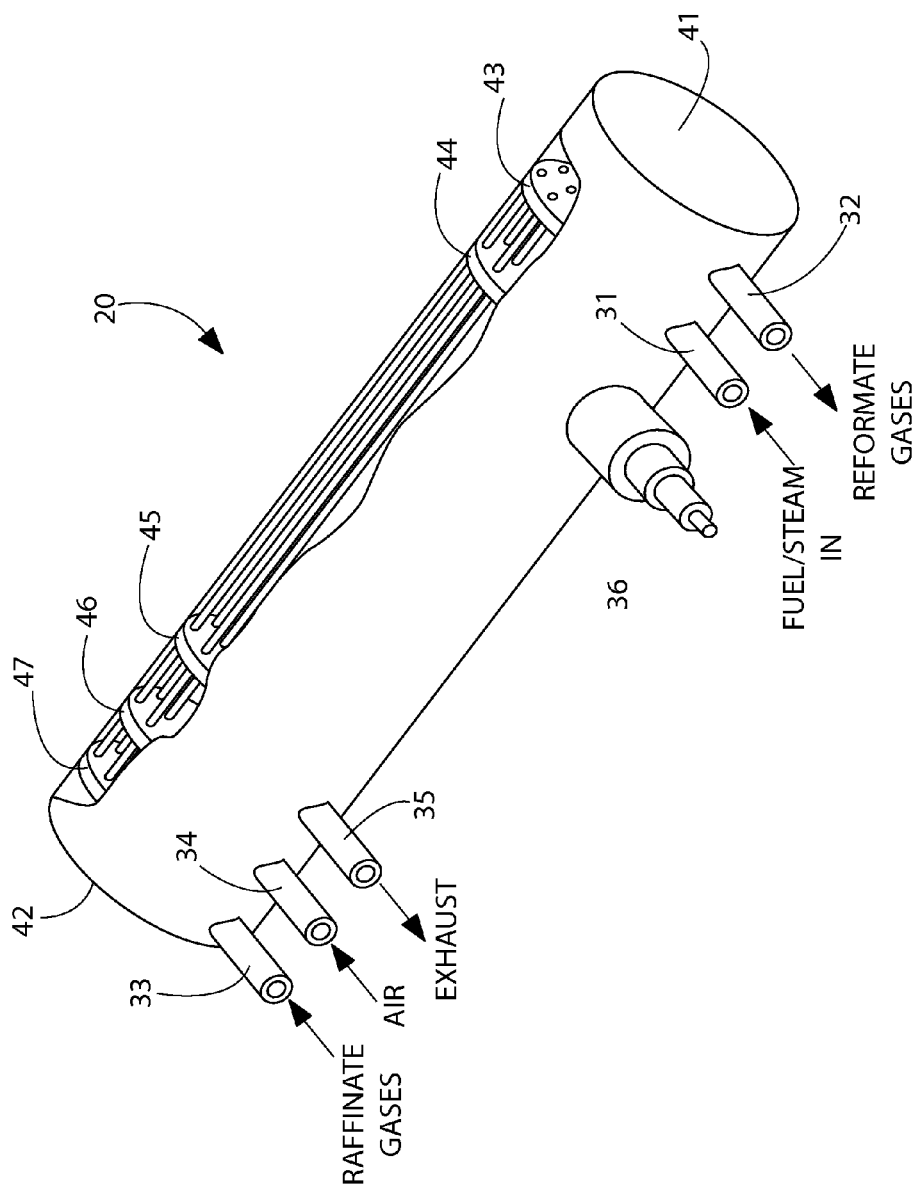
FIG. 2 is a selectively fragmented view of a first embodiment of a steam reformer that can be used within the fuel processor system of FIG. 1.

Referring to FIG. 2, a first exemplary embodiment of a micro-channel steam reformer 20 is shown. The micro-channel steam reformer 20 has five gas access ports 31, 32, 33, 34, 35 and a spark plug receptacle 36. Referring to FIG. 2 in conjunction with FIG. 1, it can be seen that the micro-channel steam reformer 20 has a fuel mixture input port 31 that receives the incoming hydrocarbon and steam mixture. As will be explained, the incoming hydrocarbon and steam mixture is efficiently supplied with heat energy and placed in an environment that optimizes a water gas shift reaction between the hydrocarbon and the steam. The water gas shift reaction produces a resultant gas mixture that has a high concentration of hydrogen. The reformate gas mixture exits the micro-channel steam reformer 20 through a resultant gas output port 32.

Energy is supplied to the micro-channel steam reformer 20 by combustion within the micro-channel steam reformer 20. The gas that is burned is the raffinate 23 of the hydrogen separator. The raffinate 23 from the hydrogen separator enters the micro-channel steam reformer 20 through a raffinate input port 33. To enable the raffinate 23 to burn, an air input port 34 enables air to enter the micro-channel steam reformer 20. The raffinate 23 burns in the presence of the air and the exhaust leaves the micro-channel steam reformer 20 through an exhaust port 35.

Figure 3:
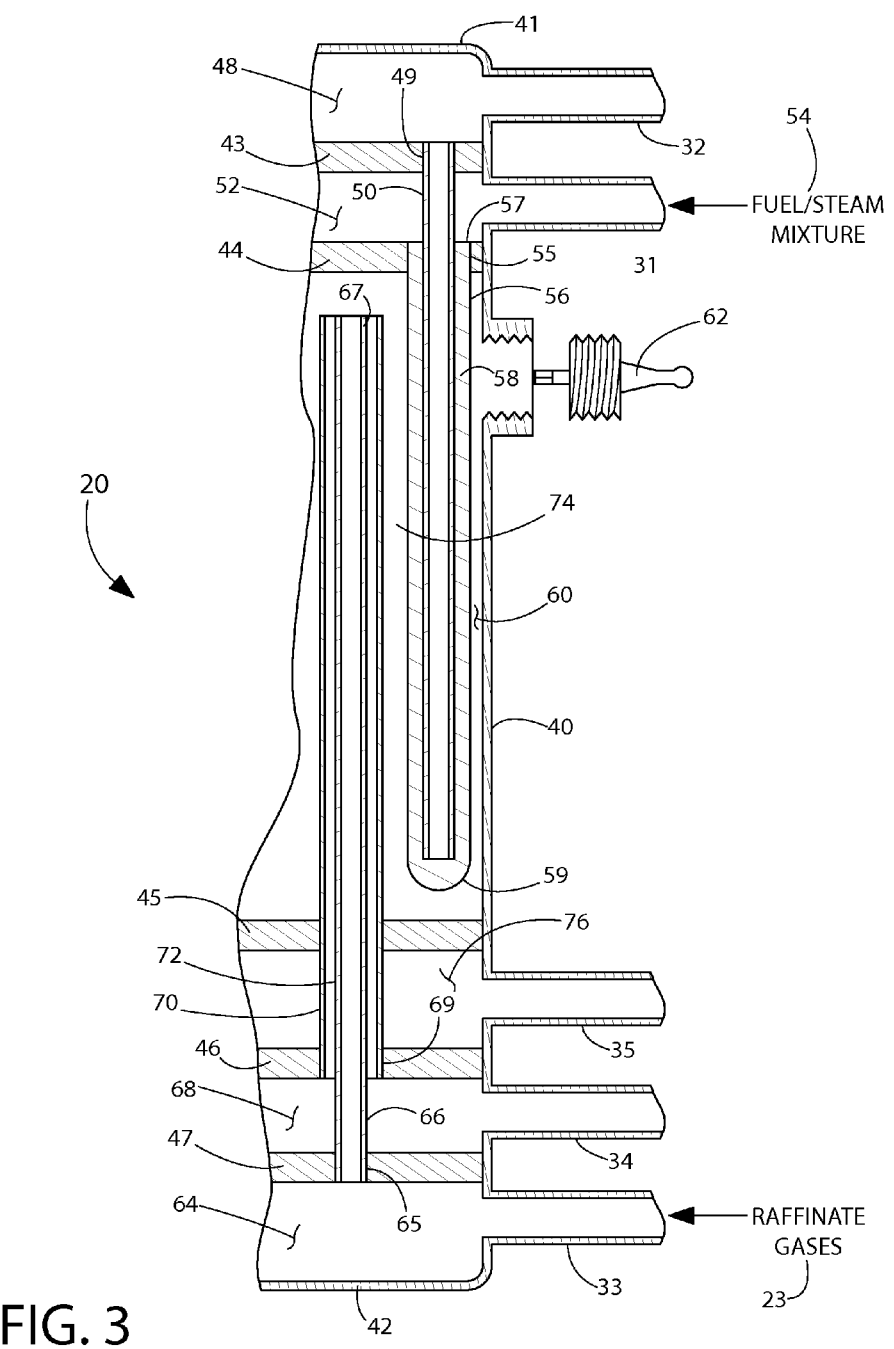
FIG. 3 is a cross-sectional view of a segment of the steam reformer shown in FIG. 2.

Referring to FIG. 3 in conjunction with FIG. 2, it can be seen that the micro-channel steam reformer 20 has a tubular body 40 that extends between a first end 41 and an opposite second end 42. Between the two ends 41, 42, five partition walls 43, 44, 45, 46, 47 are provided that internally divide the tubular body into six distinct compartments.

A first chamber 48 is formed between the first end wall 41 of the tubular body 40 and a first partition wall 43. The first chamber 48 is coupled to the resultant gas output port 32. A plurality of holes 49 are formed in the first partition wall 43. Narrow tubes 50 are welded into the various holes 49. The narrow tubes 50 extend further into the tubular body 40. The narrow tubes 50 are open at both ends. Accordingly, the only way that gas can enter the reactant gas collection chamber and exit through the resultant gas output port 32 is by the gas first being drawn through the narrow tubes 50.

A second chamber 52 is formed between the first partition wall 43 and a second partition wall 44. The second chamber 52 is connected to the fuel mixture input port 31 and receives the fuel/steam mixture 54 through the fuel mixture input port 31. A plurality of holes 55 are also formed through the second petition wall. A set of containment tubes 56 are welded to the second petition wall 44 in the holes 55. The containment tubes 56 have an interior diameter only slightly larger than the outside diameter of the narrow tubes 50. The containment tubes 56 are aligned with the narrow tubes 50, so that each of the narrow tubes 50 extends through the second chamber 52 and enters one of the containment tubes 56. A very small gap space 58 exists between the interior of each containment tube 40 and the exterior of each narrow tube 32. The gap space 58 is very small, being no larger than 5000 microns. Preferably, the gap space 56 is between 100 microns and 1000 microns.

Each of the containment tubes 56 has an open first end 57 through which a narrow tube 50 enters the containment tube. The open first end 57 of the large tubes also communicates directly with the second chamber 52. Each of the containment tubes also has a closed second end 59. As such, it will be understood that in order for a fuel/steam mixture 54 to enter and exit the micro-channel steam reformer 20, the fuel/steam mixture 54 first enters the second chamber through the fuel mixture input port 31. The fuel/steam mixture 54 then passes into the containment tubes 56 and into the gap space 58 surrounding the narrow tubes 50. In such a confined space, the water molecules and the fuel molecules are forced to interact, thereby inducing the water gas shift reaction provided sufficient heat is provided. Once the fuel/steam mixture 54 reaches the closed second end 59 of the containment tube 56, the hydrocarbon/steam mixture 54 is drawn back through the narrow tube 50. Again, due to the small diameter of the narrow tubes 50, the water molecules and hydrocarbon molecules are forced to react, therein further exhausting the desired water gas shift reaction.

The exteriors of the containment tubes 56 are heated by combustion. The containment tubes 56 and the narrow tubes 50 inside the containment tubes 56 extend into a combustion chamber 60. The combustion chamber 60 is defined within the tubular body 40 of the micro-channel steam reformer 20 between the second partition wall 44 and a third partition wall 45. Within the combustion chamber 60, the raffinate 23 from the hydrogen separator is burned in the presence of air. At operating temperature, the combustion happens spontaneously upon the mixing of the raffinate 23 with air. Bellow operational temperatures, a spark plug 62 is provided to initiate combustion.

As combustion occurs within the combustion chamber 60, the exterior of each of the containment tubes 56 is heated to the temperature of the combustion chamber 60. This provides sufficient heat energy to enable a complete water gas shift reaction within each of the containment tubes 56.

In order to create a uniform combustion profile within the combustion chamber 60, combustion gases are introduced into the combustion chamber 60 in a unique way. As has been previously stated, the combustion gases are air and the raffinate 23 from the hydrogen separator. A raffinate supply chamber 64 is formed between the second end 42 of the tubular body 40 and the fifth partition wall 47. The raffinate supply chamber 64 is connected to the raffinate input port 33.

Holes 65 are formed in the fifth partition wall 47. Small inner supply tubes 66 are welded within the hole 65. Each of the small inner supply tubes 66 has an open distal end 67 that extends into the combustion chamber 60. The distal end 67 of each small inner supply tube 66 terminates within the combustion chamber 60 proximate the second partition wall 44.

An air supply chamber 68 is formed between the fifth partition wall 47 and a fourth partition wall 46. The air supply chamber 68 is connected to the air input port 34 and receives air through that port.

Holes 69 are formed in the fourth partition wall 46. Outer supply tubes 70 are welded into the holes 69. The outer supply tubes 70 have two open ends. The outer supply tubes are aligned with the inner supply tubes 66 so that the inner supply tubes 66 extend into the larger outer supply tubes 70. A gap 72 exists between the interior of each outer supply tube 70 and the exterior of each inner supply tube 66. As such, air can run inside the outer supply tubes 70 around the inner supply tubes 66. The outer supply tubes 70 terminate at the same point as the inner supply tubes 66. The inner supply tubes supply raffinate 23. The outer supply tubes supply air. These combustion gases are released into the combustion chamber 60 near the second partition wall 44.

Once the raffinate 23 enters the combustion chamber 60, they ignite. Ignition is spontaneous when the micro-channel steam reformer 20 is at operational temperatures. However, upon initial start up, the spark plug 62 can be activated to initiate combustion.

Due to the density of the containment tubes 56 and the outer supply tubes 70 within the combustion chamber 60, only small open areas 74 exist between the various tubes. Combustion takes place throughout these open areas 74.

An exhaust port 76 is provided at the end of the combustion chamber opposite from the end where the combustion gases begin to ignite. Accordingly as the combustion gases ignite, they are drawn down the combustion chamber 60 along the side of containment tubes 56 and the outer supply tubes 70. After combustion, the hot exhaust gases continue to be drawn past the various tubes until the exhaust gases exit through the exhaust port 76. Due to the path of the combustion gases and the small open areas 74 between tubes in which combustion can tale place, heat from the combustion is efficiently transferred to all the containment tubes 56 and the outer supply tubes 70 within the combustion chamber. The containment tubes 56 that carry the fuel/steam mixture is provided with enough energy to exhaust the water gas shift reaction. Likewise, the outer and inner supply tubes 66, 70 tubes carrying the combustion gases are provided with enough heat energy to preheat the combustion gases so that the gases combust spontaneously and do not cool the combustion chamber 60.

From the above, it will be understood that as the hydrocarbon/steam mixture 54 enters the micro-channel steam reformer 20, the fuel/steam mixture 54 is forced to flow down through the narrow tubes 50. As the fuel/steam mixture 54 exits the narrow tubes 50, the fuel/steam mixture is forced to pass through the ultra-small gap spaces 58 between the containment tubes 56 and the narrow tubes 50. Heat is added to the fuel/steam mixture 54 while in the gap spaces 58, therein inducing the water gas shift reaction to occur. By spreading the fuel/steam mixture 54 very thinly throughout the available gap spaces 58, a highly efficient water gas shift reaction can be created, wherein most of the incoming fuel is converted to less complex molecules.

To ensure a highly efficient water gas shift reaction, heat must be quickly added to the fuel/steam mixture 54 while it flows through the gap spaces 58. To ensure an adequate heat flow, burning is maintained within the combustion chamber 60. The dry raffinate 23 is burned in the combustion chamber 60, making the combustion chamber 60 very hot. Furthermore, the various tubes in the combustion chamber 60 are made with a very thin wall thickness to optimize heat flow through the walls of the tubes. Preferably, both the containment tubes 56 and the outer supply tubes have a wall thickness of between five and fifty thousandths of an inch.

In the combustion chamber 60, the dry raffinate 23 is mixed with air and ignited. The burning dry raffinate 23 surrounds the containment tubes 56, therein providing uniform heat to the containment tubes 56 and to the gap space 58 within the containment tubes 56. The exhaust gases that exit the containment tubes 56 are very hot and are used to help heat the initial heat exchanger 18 (FIG. 1), as has previously been indicated.

It will be understood that the embodiment of the micro-channel steam reformer and the overall fuel processor system are merely exemplary and that a person skilled in the art can make many changes using functionally equivalent configurations. For instance, the tubes for supplying air and raffinate gases can be reversed. Likewise, the tubes for directing the fuel/steam mixture into and out of the combustion chamber can also be reversed. All such variations, modifications, and alternate embodiments are intended to be included within the present invention as defined by the claims.

What is claimed is:

1. A method of inducing a water gas shift reaction between a hydrocarbon fuel and steam, said method comprising the steps of:
   providing an inner tube;
   providing an outer tube concentrically surrounding said inner tube, wherein a gap space exists between said inner tube and said outer tube;
   mixing said hydrocarbon fuel with said steam to produce a fuel/steam mixture;
   flowing said fuel/steam mixture in said gap space; and
   heating said outer tube to maintain a reaction temperature range within said gap space that induces said water gas shift reaction.

2. The method according to claim 1, wherein said gap space between said separate surfaces is no greater than 1000 microns.

3. The method according to claim 1, wherein said step of heating said outer tube includes providing a combustion chamber, positioning at least part of said outer tube within said combustion chamber; and burning fuel within said combustion chamber.

4. The method according to claim 3, wherein said water gas shift reaction creates hydrogen gas and waste raffinate gases, wherein said step of burning fuel includes burning at least some of said raffinate gases.

5. The method according to claim 3, further including the step of providing supply tubes that extend into said combustion chamber.

6. The method according to claim 5, further including the step of introducing combustion gases into said combustion chamber through said supply tubes.

7. The method according to claim 5, wherein said supply tubes contain a fuel supply tube and an air supply tube.

8. The method according to claim 7, wherein said fuel supply tube and said air supply tube are concentric.

9. A method of producing hydrogen rich gases from a supply of hydrocarbon fuel, said method comprising the steps of:
   providing a hydrocarbon fuel;
   providing steam;
   mixing said hydrocarbon fuel and said steam to produce a fuel/steam mixture;
   providing a gap space between an inner tube and a surrounding outer tube that are concentrically oriented;
   heating said outer tube;
   introducing said fuel/steam mixture into said gap space to create a reaction between said hydrocarbon fuel and said steam, wherein said reaction produces reactant gases that include hydrogen gas and contaminant gases.

10. The method according to claim 9, wherein said step of heating said outer tube includes burning at least some of said contaminant gases.

11. The method according to claim 9, wherein said gap space is no greater than 5000 microns.

12. The method according to claim 11, wherein said gap space between said opposing surfaces is no greater than 1000 microns.

13. The method according to claim 9, wherein said step of introducing said fuel/steam mixture into said gap space includes flowing said fuel/steam mixture into said gap space through said outer tube and drawing said fuel/steam mixture out of said gap space through said inner tube.

14. The method according to claim 9, wherein said step of introducing said fuel/steam mixture into said gap space includes flowing said fuel/steam mixture into said gap space through said inner tube and drawing said fuel/steam mixture out of said gap space through said outer tube.

15. The method according to claim 9, wherein said step of heating said outer tube includes providing a combustion chamber, positioning at least part of said outer tube within said combustion chamber; and burning some of said reactant gases within said combustion chamber.

16. The method according to claim 15, further including the step of providing supply tubes that extend into said combustion chamber.

17. The method according to claim 16, further including the step of introducing some of said reactant gases into said combustion chamber through said supply tubes.

18. The method according to claim 17, wherein said supply tubes contain a fuel supply tube and an air supply tube.

19. The method according to claim 18, wherein said fuel supply tube and said air supply tube are concentric.

20. A method of operating a steam reformer for use in inducing a water gas shift reaction between steam and a hydrocarbon, said method comprising the steps of:
   providing an inner tube and a concentric outer tube so that a gap space exists between said inner tube and said outer tube;
   heating said outer tube to a temperature of over 500 degrees Celsius; and
   flowing said steam and said hydrocarbon through said gap space.

* * * * *